June 20, 1967     ICHIRO ARIMURA ETAL     3,327,053
RECORDER MOTOR SYNCHRONIZATION USING GATED SYNC. SIGNALS
Filed Dec. 26, 1963     7 Sheets-Sheet 2

INVENTORS
Ichiro Achimura
Snozo Aratani
Toshio Morita
Takahiro Nakamura
BY Stevens, Davis, Miller & Mosher
ATTORNEYS

United States Patent Office 3,327,053
Patented June 20, 1967

3,327,053
RECORDER MOTOR SYNCHRONIZATION USING GATED SYNC SIGNALS
Ichiro Arimura, Kyoto, Shozo Aratani, Osaka, Toshio Morita, Moriguchi-shi, and Takahiro Nakamura, Kadoma-shi, Japan, assignors to Matsushita Electric Industrial Co., Ltd., Osaka, Japan, a corporation of Japan
Filed Dec. 26, 1963, Ser. No. 333,390
Claims priority, application Japan, Dec. 28, 1962, 37/59,704, 37/59,706; Feb. 28, 1963, 38/10,847; Nov. 20, 1963, 38/63,093
7 Claims. (Cl. 178—6.6)

The present invention relates to improved means for recording and reproducing in a magnetic recording and reproducing system. More particularly, the invention relates to a device for recording and reproducing a wideband signal comprising a magnetic tape and a rotary drum including a plurality of magnetic transducers, wherein means are provided so that, when the wide-band signal having been recorded by a diagonal sweep by the rotary magnetic transducers across the magnetic tape is reproduced, each of the rotary magnetic transducers can strictly retrace the tracks recorded by itself.

In conventional magnetic recording methods of directly recording on a magnetic tape a signal such as a television signal having an extremely high frequency or ranging over an extremely wide frequency band, it has generally been necessary to provide an excessively great relative speed between a recording or reproducing head and a magnetic medium moving past the gap of such head in order to effect the reproduction of high frequency components of the signal. On the other hand, the magnetic medium such as a magnetic tape is ordinarily required to run at a low speed. As a compromise to satisfy both of these requirements, the required relative speed between the tape and the recording head is attained by mechanically rotating the magnetic head at a high speed in the transverse direction of the tape. The tape is made to move past said head in the longitudinal direction of the tape at a rate of 15 inches per second, so that the signal is recorded in the form of a series of transverse lines or tracks.

In a conventional device for recording and reproducing a wide-band signal having such rotary magnetic heads, a synchronous motor is employed to drive the rotary drum and the motor is rotated in synchronism with a periodic signal in the signal to be recorded, or in synchronism with an output frequency of an oscillator having good stability, so that a specific signal representing a rotating frequency and phase of said synchronous motor is recorded in the form of a control signal. During reproducing, this control signal is compared with said specific signal representing the rotating phase and frequency, and an error signal thereby obtained is utilized to automatically control the rotating frequency and phase of the synchronous motor for driving the rotary drum, or a drum servo or capstan servo system is employed for controlling the speed of the magnetic tape in the longitudinal direction thereof so that each of the rotary magnetic heads can retrace the tracks having been drawn by itself during recording. However, the conventional devices of such systems require many parts and are complicated in structure in addition to being expensive.

With such defects of prior techniques in view, the primary object of the invention is to provide an improved device for recording and reproducing a wide-band signal comprising a magnetic tape, and a rotary head including a plurality of magnetic transducers, wherein means are provided to maintain a predetermined rotating phase of said magnetic transducers on the rotary head adapted to successively sweep diagonally across the magnetic tape.

Another object of the invention is to provide a device of said character, wherein means are provided so that a signal responsive to the rotation of the rotary head which has been additionally recorded on the tape during recording is utilized as a signal for controlling the rotating phase of the rotary head during reproducing, whereby the tracks recorded by the respective magnetic transducers can be traced during reproducing by the same magnetic transducers with the ones used in the recording.

Still another object of the invention is to provide a magnetic recording and reproducing device of said character, wherein means are provided to take out during recording solely a periodic signal from a signal to be recorded to record such periodic signal additionally on one edge of the tape, so that, during reproducing, said periodic signal can be reproduced and utilized as a signal for controlling the rotating phase of the rotary head, whereby the tracks recorded by the respective magnetic transducers can be traced during reproducing by the same magnetic transducers with the ones used in the recording.

Yet another object of the invention is to provide a device of said character adapted for recording and reproducing a television signal, comprising a rotary head including two magnetic transducers adapted for rotation during recording in synchronism with a synchronizing signal in a television signal to be recorded, wherein means are provided to take out during recording the synchronizing signal from the television signal to be recorded, to convert the synchronizing signal into pulses having positive and negative polarities corresponding to the respective rotating phases of the two magnetic transducers, and to record such pulses additionally on the tape, so that, during reproducing, said pulse signal can be reproduced and utilized as a signal for controlling the rotating phase of the rotary head, whereby the tracks recorded by the respective magnetic transducers can be traced during reproducing by the same magnetic transducers with the ones used in the recording.

Further another object of the invention is to provide a device of said character adapted for recording and reproducing a television signal, comprising a rotary head including two magnetic transducers adapted for rotation during recording in synchronism with a synchronizing signal in a television signal to be recorded, wherein means are provided to take out pulses having positive and negative polarities responsive to the rotation of the respective magnetic transducers, and to record such pulses additionally on the tape, so that during reproducing said pulse signal is reproduced and utilized as a signal for controlling the rotating phase of the rotary head, whereby the tracks recorded by the respective magnetic transducers can be traced during reproducing by the same magnetic transducers with the ones used in the recording.

Another object of the invention is to provide a device of said character adapted for recording and reproducing a wide-band signal including a periodic information comprising a plurality of magnetic transducers, wherein means are provided to additionally record on the tape a signal responsive to the rotation of the rotary head rotating during recording in synchronism with a periodic information in the signal to be recorded, and to reproduce said signal during reproducing to utilize it as a signal for controlling an oscillation frequency of an oscillator for generating a signal for controlling the rotating phase of the rotary head, whereby the tracks recorded by the respective magnetic transducers can be traced during reproducing by the same magnetic transducers with the ones used in the recording.

Still another object of the invention is to provide a device of said character adapted for recording and reproducing a wide-band signal including a periodic information, comprising an electric motor for driving a rotary head including a plurality of magnetic transducers, said electric motor being a brushless D.C. synchronous motor operative to rotate readily and strictly in synchronism with an external synchronizing signal, wherein means are provided to additionally record on the tape a signal responsive to the rotation of the rotary head rotating during recording in synchronism with the periodic information in the signal to be recorded, and to reproduce said signal during reproducing to utilize it as a signal for controlling the rotating phase of the brushless D.C. synchronous motor for driving the rotary head, whereby the tracks recorded by the respective magnetic transducers can be traced during reproducing by the same magnetic transducers with the ones used in the recording.

There are other objects and particularities of the invention which will become obvious from the following description with reference to the accompanying drawings, in which.

Figure 1:
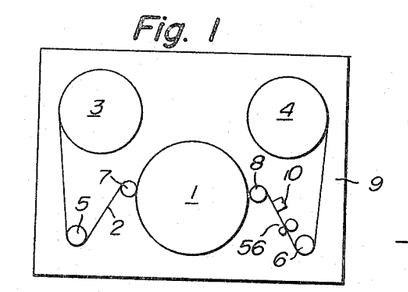
FIG. 1 is a plan view of an embodiment of a magnetic recording and reproducing device of the invention.

In FIG. 1 and succeeding drawings, there are illustrated various embodiments of a magnetic recording and reproducing device of the invention, which provides ease of maintenance while working at a high efficiency and comprises a rotary head including a plurality of magnetic transducers, and in which means are provided to maintain a predetermined rotating phase of said magnetic transducers.

With regard to the conventional methods described above, several examples may be cited, but hereinunder description will be made with reference to a most typical method among them. This method is known as the Ampex system (Ampex Corporation, city of Redwood City, State of California, U.S.A.) and described in fairly detail on pages 138–144 of "Electronics," August number, 1953. This method has been further disclosed in detail in various publications in addition to the cited magazine. As an example, "Journal of the S.M.P.T." can be cited. Hereinunder, an outline of synchronizing means incorporated in the device of the Ampex system will be explained.

The Ampex system has a structure as shown in a block diagram of FIG. 12 and will be explained with reference to the drawing. A synchronous motor 49 is used to drive a magnetic head drum having thereon magnetic transducers. The motor 49 is operative to rotate the magnetic head drum at 14,400 r.p.m. and commonly called a head drum motor. An automatic control system including the motor is called a drum servo system. According to this method, a power source frequency in synchronism with the number of revolutions of the motor is employed as a basis of control in the automatic control system, and the number of revolutions of the synchronous motor is made to vary by varying the power source frequency. Therefore, it is necessary to provide a motor driving amplifier 50 separately from the entire power source for the motor 49. Thus, entire power for the motor 49 is supplied from said motor driving amplifier 50. Frequency of the power supplied to the motor 49 is regulated by an oscillator 51, output of which is impressed on said motor driving amplifier 50.

With the movement of the magnetic head drum driven by the motor 49, a periodic electrical signal linearly proportional to the rotary movement is generated and detected by a detector 52. This electrical signal is called a DEC signal. Said electrical signal detected by the detector 52 is amplified by a detected signal amplifier 53, output of which is supplied to a phase comparator 54. Another signal supplied to the phase comparator 54 is a so-called reference signal which is admitted through a reference input terminal 55. During recording, the reference signal is derived from a vertical synchronizing signal in an input video signal. During reproducing, the reference signal is obtained by reproducing from a magnetic tape the detected signal having been recorded on one edge of the tape during recording. This phase comparator 54 is operative to compare the phases of said two electrical signals, that is, the detected signal and the reference signal and supplies to the oscillator 51 a D.C. output proportional to the error between the phases. The oscillator 51 is so arranged that its oscillation frequency varies according to the D.C. output of the comparator 54. The number of revolutions of the motor 49 is thus regulated by the oscillator 51, and the electrical signal proportional to the number of revolutions of the motor 49 is returned to the phase comparator 54 through the detector 52. Therefore, the phase detection is effected at the same time, and the entire power input to the motor 49 can be obtained from the output of the motor driving amplifier 50. It will thus be known that the above arrangement inevitably requires a motor driving amplifier of a bulky structure and an oscillator associated therewith. As will be understood from the foregoing explanation, this method is defective in various aspects considering the complex operation on which it is based.

Now, explanation will be given with regard to the device of the invention which works free from the prior defects and provides ease of maintenance as well as simplified means for recording and reproducing.

One form of magnetic tape driving means embodying the invention will be described with reference to FIGS. 1 and 2. A base plate 9 is commonly called a tape transport panel. A cylindrical tape guide member (not shown) is disposed about the periphery of a rotary head disc 1 and has a gap through which tip portions of magnetic heads 11 and 12 protrude. The tape guide member has its axis slightly inclined with respect to the base plate 9. Therefore, the rotary head drum 1 disposed in the tape guide member in coaxial relation thereto and an electric motor 26 for driving the rotary drum 1 have the same inclination with respect to the base plate 9. A magnetic tape 2 is fed out of a supply reel 3 and guided past a first idler roller 5 having an axis perpendicular to the base plate 9 and a second idler roller 7 having an axis parallel with the tape guide member towards the tape guide member. During abutment of the tape 2 with the guide member, recording or reproducing is effected by the magnetic heads 11 and 12 mounted on the rotary drum 1. Then, the tape 2 is guided away from the tape guide member, fed past another idler roller 8, a control signal head 10, a capstan mechanism 56 and another idler roller 6 and taken up on a take-up reel 4.

Hereinunder, description will be made with regard to an embodiment of a magnetic recording and reproducing device of the invention having the rotary disc, which is adapted to operate with a two head system and handles a signal in the form of a composite video signal. That is to say, the following description relates to an embodiment of a two head system magnetic recording and reproducing device of the invention.

Figure 2:
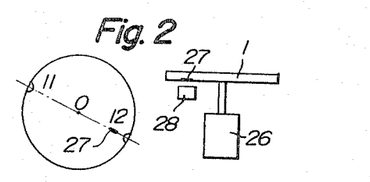
FIG. 2 is a plan and a side view of a rotary head drum incorporated in the magnetic recording and reproducing device according to the invention.
Figure 3:
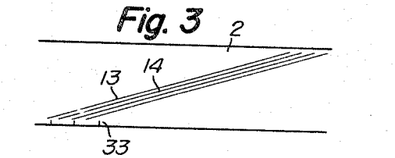
FIG. 3 is a plan view of a portion of a magnetic tape on which tracks are shown as recorded by the device according to the invention adapted for recording and reproducing a wide-band signal.

FIG. 2 shows the rotary disc 1 shown in FIG. 1. The rotary disc 1 has the center O and the two magnetic heads 11 and 12 are disposed on its diametral line. The rotary drum 1 is a rotary body driven by a unique synchronous motor. The rotary body is slightly inclined with respect to the travelling tape. When, therefore, the magnetic tape 2 is made to run along the periphery of such rotary body 1 in abutting relation therewith, it will be apparent that magnetized patterns formed on the magnetic tape 2 by the magentic heads 11 and 12 take the form of two tracks 13 and 14 which appear alternately as shown in FIG. 3. The invention is characterized in that a peculiar motor such as a brushless D.C. motor or a reluctance motor is employed to drive the rotary drum, instead of the servo system employed in the conventional device, in order that such magnetized tracks of record can be strictly retraced during reproducing.

Figure 4:
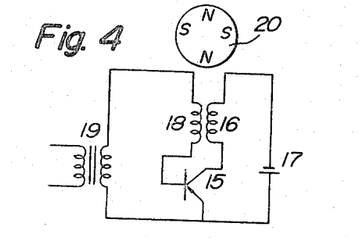
FIG. 4 is a schematic circuit diagram of a brushless motor representing one form of a rotary drum driving motor incorporated in the magnetic recording and reproducing device of the invention.

In the following description, one form of said peculiar motor will be explained, taking the case of the brushless D.C. motor. In FIG. 4, numeral 15 denotes a transistor, and a collector coil 16 and a D.C. source 17 are connected between its collector and emitter, while a base coil 18 and a transformer 19 for external synchronization are connected in series between its emitter and base, so that a switching circuit is thereby formed. The collector coil 16 and the base coil 18 are wound about magnetic poles of a stator (not shown) to form a field winding, and a permanent magnet rotor 20 is made to rotate in the field system. Or more precisely, the circuit makes a switching action by a voltage induced in the base coil 18 by the rotation of the permanent magnet rotor 20, and the stator poles are excited by a curent flowing through the collector coil 16. Thus, the rotor 20 is made to rotate continuously by repulsion or attraction exerted on the magnetic poles of the permanent magnet rotor 20.

Although the motor of the type rotates strictly in synchronism with a frequency of an external synchronizing signal admitted through the synchronizing transformer 19, its rotating phase is not always constant. In a four pole brushless D.C. motor having the rotor 20 comprising two N and two S poles, for example (or multi pole brushless D.C. motor having a multiplicity of N and S poles), two ways of synchronization are usually made in which phases are shifted by 180° from each other with respect to the synchronous input, and constant phasic relation is not maintained between the synchronous input and the rotating phase at all times. The invention is further characterized in that the phasic relation between the two can be constantly maintained at all times.

The brushless D.C. motor is adapted to operate with supply voltage of 30 volts, power consumption of 15 watts, four poles, 1,800 r.p.m. and synchronous input signal at 60 cycles. The rotary drum 1 has a diameter of 220 mm., and the magnetic heads 11 and 12 mounted on the rotary drum 1 are made of such material as aluperm or ferrite and have an impedance of the order of 1KΩ at a frequency of 3 mc./s. Each magnetic head has a head gap of about 2 $\mu$m. and a track width of 300 $\mu$m. The magnetic tape 2 is a video tape having a width of 1 inch comprising a thin base coated with iron oxide. The tape 2 is made to run along a semicircular arc of the rotary head drum guide member (not shown) at a rate of about 38 cm. per second. From the above relation, the relative speed between the magnetic heads and the magnetic tape will become about 20 m. per second. Since the rotary drum 1 has an inclination of the order of 3° with respect to the travelling direction of the tape, the tracks drawn by the magnetic heads will be as shown at 13 and 14 in FIG. 3. Each of the tracks corresponds to the track drawn by one head in its half turn during a period of $\frac{1}{60}$ second, and one field of a video information in a signal to be recorded is recorded in each track.

Figure 5:
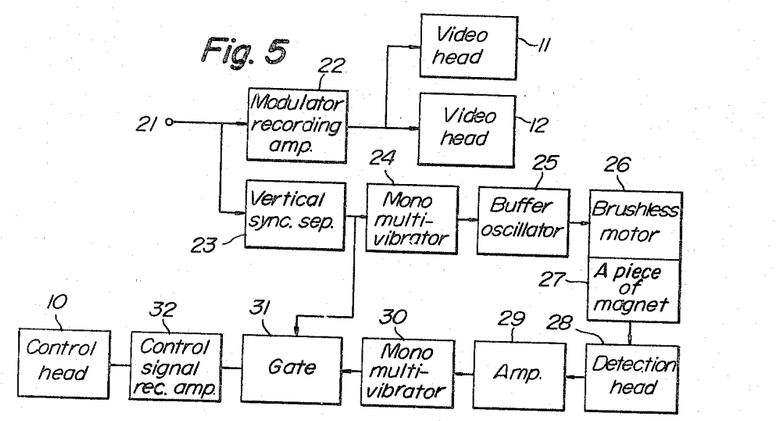
FIG. 5 is a block diagram of an electrical circuit of the two head system television signal recording and reproducing device of the invention during recording.

FIG. 5 shows a block diagram of the device according to the invention, wherein a composite video signal is impressed on an input terminal 21, fed through suitable modulating means (for example frequency modulation means) such as a modulator and recording amplifier 22, and impressed on the magnetic heads 11 and 12 for being recorded on the magnetic tape. On the other hand, a vertical synchronizing signal of 60 p.p.s. is solely separated from the composite video signal by a vertical synchronizing signal separator 23. The output of the separator 23 is used to trigger a monostable multivibrator 24, a delayed differentiated output of which is used to lock a buffer oscillator 25 in the succeeding stage. The output of the buffer oscillator 25 is used to rotate a brushless motor 26 in synchronous relation thereto. The synchronizing signal input has a wave form analogous to a rectangular shape of about 5 v.p.p. In order to obtain a signal synchronized with the rotation of the rotary drum and to detect the rotating phase of the magnetic heads, a piece of magnet 27 is embedded in the rotary drum 1 at a position on its diametral line on which the two magnetic heads 11 and 12 are disposed, and a detection head 28 is fitted on the panel 9. A pulse signal of 30 p.p.s. induced in the detection head 28 is amplified by a pulse amplifier 29 and used to trigger a monostable multivibrator 30 in the succeeding stage, an output square wave of which is used as a gating pulse signal for a gate circuit 31.

Figure 6:
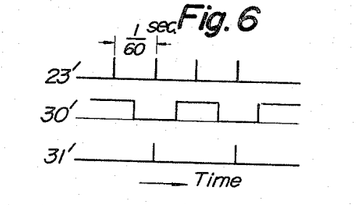
FIG. 6 is a diagram showing wave forms at various parts in the electrical circuit diagram of FIG. 5.

When it is so arranged that a relation as shown in FIG. 6 consists between the output 23' of the vertical synchronizing signal separator 23 and the output 30' of the monostable multivibrator 30, the output 31' of the gate circuit 31 of 30 p.p.s. is obtained as shown. That is, under this synchronous condition, the vertical synchronizing signal has the same phasic relation with respect to time with the signal representing the rotating phase of the magnetic heads. The output 31' is supplied during recording as a control pulse signal through a control amplifier 32 to the fixed control head 10 for being recorded on one edge of the tape. In FIG. 3, the relation between the video tracks 13 and 14 and the control track 33 is shown. By the relation between the magnetic head 11 (or 12) and the magnet piece 27, and the detection head 28 and the control head 10 in FIGS. 1–3, the recorded position of the video track 13 (or 14) relative to that of the control track 33 is fixed at all times, and the phasic relation between the recorded control signal and the rotating phase of the magnetic head is likewise fixed at all times.

Figures 7, 8, 9:
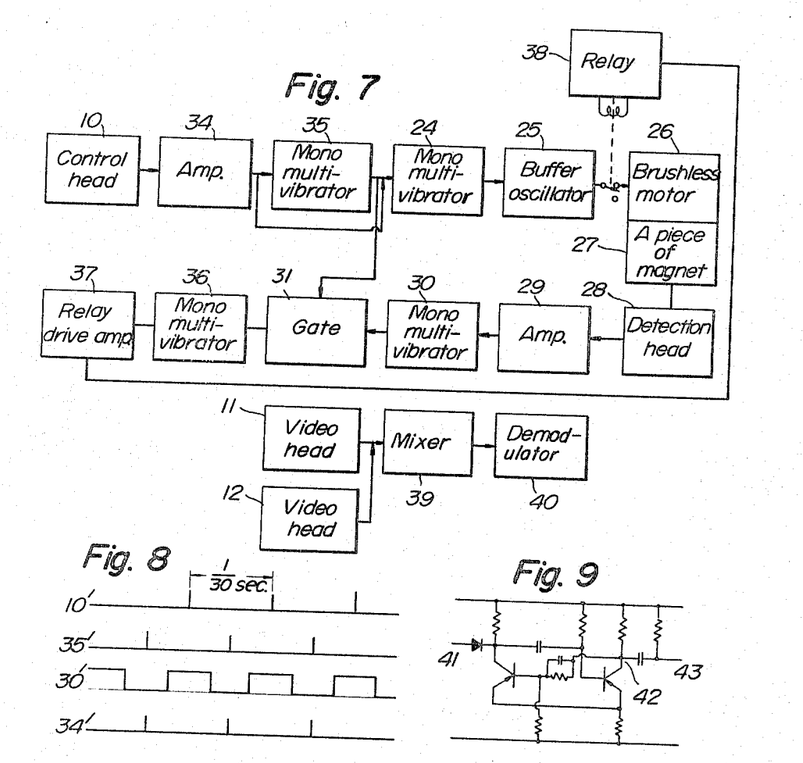
FIG. 7 is a block diagram of an electrical circuit of the two head system television signal recording and reproducing device of the invention during reproducing.
FIG. 8 is a diagram showing wave forms at various parts in the electrical circuit diagram of FIG. 7.
FIG. 9 is an electrical circuit diagram of one form of a monostable multivibrator shown in the block diagrams of FIGS. 5 and 7.

FIG. 7 shows a block diagram of the device according to the invention during reproducing. The control signal of 30 p.p.s. reproduced by the control head 10 is amplified by a suitable amplifier 34 and triggers a monostable multivibrator 35 in the succeeding stage, a delayed differentiated output 35' of which is mixed with said triggering input to the monostable multivibrator 35 to turn into a signal of 60 p.p.s. This signal is supplied through the monostable multivibrator 24 and the buffer oscillator 25 used in the recording to the brushless motor 26 for synchronous rotation thereof.

Since, however, there are two synchronizing points when the four pole brushless motor as described above is used, the magnetic heads 11 and 12 do not necessarily retrace the tracks drawn by themselves during the recording.

In order that the magnetic heads can trace the respective tracks at all times, the following operation must be made. In this case, it is necessary that the relation as shown by signals 30' and 31' in FIG. 6 must be obtained between the gating pulse signal 30' which is in the same relation as in the recording and the reproduced control pulse signal 10' of 30 p.p.s. When, therefore, the signal 35' (FIG. 8) which is delayed by 180° from the control pulse is impressed on the gate circuit 31 (same one with that used in the recording), an output 34' of the gate, if any, has a phasic relation as shown in FIG. 8. From FIG. 8, it will be known that the two magnetic heads 11 and 12 do not trace the respective tracks drawn by themselves and one head traces the track drawn by the other head. This detected signal 34' of 30 p.p.s. is used to trigger a monostable multivibrator 36 in the succeeding stage and an output thereof is rectified to give a direct current. A relay drive amplifier 37 in the succeeding stage is actuated by the variation in the direct current which is developed depending on the presence or absence of the output from the monostable multivibrator 36, to thereby on-off the contacts of a relay 38. When, under the above condition, the signal of the buffer oscillator is temporarily cut off by the contacts to temporarily intercept the synchronization of the brushless motor, the brushless motor is pulled out of synchronization for that period and starts to rotate at a natural frequency of the order of 62 cycles per second. Then, the gating pulse signal 34' ceases to appear by the natural rotation of said brushless motor for driving the rotary drum, and the relay 38 is reenergized to pull in said drum motor which therefore rotates in synchronism with the buffer oscillator 25. Under this condition, the magnetic heads 11 and 12 can normally trace the respective tracks. On the other hand, high frequency signals reproduced by the magnetic heads 11 and 12 are mixed in a suitable mixer 39 to form a series of continuous signals, which are then demodulated by a demodulator 40 to provide the reproduced video signal.

From the above explanation, it is believed that the invention will be readily understood. Further, from the constitution described above, various modifications as described below can readily be made.

In the above embodiment wherein the brushless motor is used to drive the rotary drum, the synchronizing input from the buffer oscillator to the brushless motor is cut off to utilize the natural frequency of rotation of the motor in order to attain the temporary change in the rotating phase of the rotary drum. According to a first modification for attaining the temporary variation in the rotating phase of the rotary drum, a similar effect can be attained by cutting off the synchronous input to the buffer oscillator and by varying the frequency of the buffer oscillator by changing over the value of a resistor or condenser forming the buffer oscillator for regulating the oscillation frequency by the use of the relay 38.

In the above embodiment, the signal representing the rotating phase of the magnetic heads mounted on the rotary drum is obtained from the vertical synchronizing signal in the video signal to be recorded and utilized as the control signal. In a second modification, an output from the detection head may be amplified and recorded and an equal effect may thereby be attained.

Figure 10:
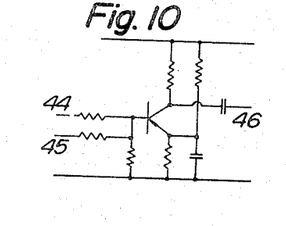
FIG. 10 is an electrical circuit diagram of one form of a gate shown in the block diagrams of FIGS. 5 and 7.
Figure 11:
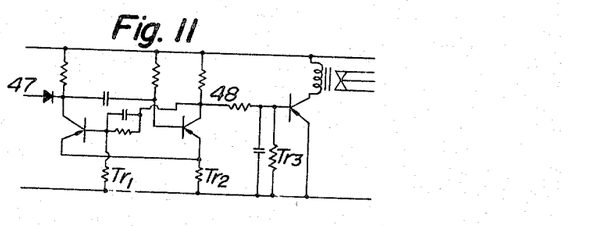
FIG. 11 is an electrical circuit diagram of one form of a relay drive circuit shown in the block diagrams of FIGS. 5 and 7.

FIGS. 9, 10 and 11 show one form of the monostable multivibrator, gate circuit and relay drive circuit, respectively, wherein a PNP transistor is incorporated. In the monostable multivibrator shown in FIG. 9, a triggering input is admitted from a terminal 41 and a square wave output is obtained at a terminal 42. A delayed differentiated output is obtained at a terminal 43. In the gate circuit of FIG. 10, a gate pulse signal and an input to be gated are impressed on terminals 44 and 45, respectively, and a transistor conducts at a potential which is slightly on the negative side of an emitter potential so that an output is obtained at a terminal 46. In the relay drive circuit of FIG. 11, a transistor $Tr_2$ conducts whenever there is no triggering input at a terminal 47, and a terminal 48 is at an emitter potential, therefore a transistor $Tr_3$ does not conduct. A square wave output appears at the terminal 48 when there is a triggering input at the terminal 47, and its mean D.C. output urges the transistor $Tr_3$ to conduct to thereby energize the relay.

Figure 15:
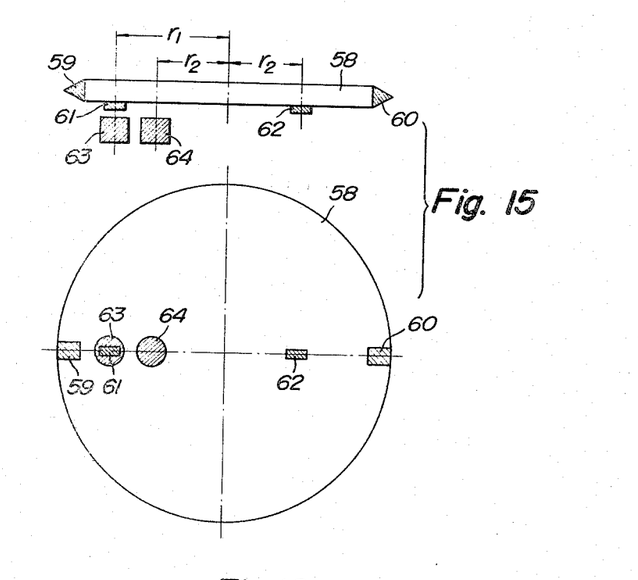
FIG. 15 is a plan and a side view of a rotary head disc in the magnetic recording and reproducing device of the invention shown in FIG. 13.

Next, description will be made with regard to another embodiment of the device according to the invention. As shown in the block diagram of FIG. 13, a magnetic tape 56 is driven by a capstan motor 57, and rotary magnetic heads 59 and 60 are mounted on a rotary disc 58 in 180° spaced relation as shown in FIG. 15. Small pieces of permanent magnets 61 and 62 corresponding to the respective rotary magnetic heads 59 and 60 are firmly secured in 180° spaced relation on the rotary disc 58 at positions of different radius from the center of the disc 58. Detection heads 63 and 64 are provided with relation to the respective pieces of permanent magnets 61 and 62 in a manner that a signal can be detected every 1/30 second from the respective magnets 61 and 62 during the rotation of the rotary disc 58. When, therefore, the rotary magnetic heads 59 and 60 pass a certain position, signals corresponding to the respective heads can be derived from the detection heads 63 and 64. The phase difference between the output signals of the detection heads 63 and 64 is 180° as shown in FIG. 2.

Figure 14A:
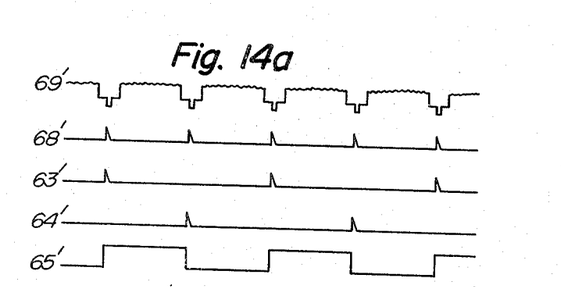
FIG. 14a is a diagram showing wave forms during recording at various parts in the block diagram shown in FIG. 13.
Figure 14B:
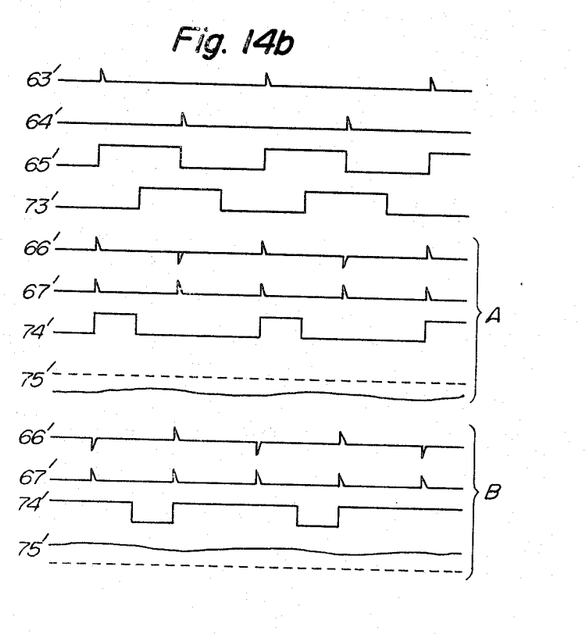
FIG. 14b is a diagram showing wave forms during reproducing at various parts in the block diagram shown in FIG. 13.
Figure 16:
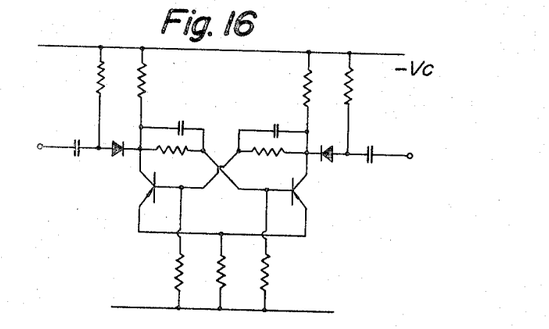
FIG. 16 is an electrical circuit diagram of one form of a flip-flop circuit shown in the block diagram of FIG. 13.

FIG. 16 shows a flip-flop circuit 65 which is actuated by the output signals from the detection heads 63 and 64. The output signal 63' of the detection head 63 triggers a transistor 82, and the output signal 64' of the detection head 64 triggers a transistor. An output signal 65' of the flip-flop circuit 65 obtained from the collector of the other transistor has a wave form of square shape at a frequency of 30 cycles per second as shown in FIG. 14a. There is provided another magnetic head 66 which acts to record on or reproduce from one edge of the magnetic tape 56 the output signal from the flip-flop circuit 65, as in the case of FIG. 13. The square wave of 30 cycles per second is impressed on the head 66 for being recorded on the tape. It has already been understood that, during reproducing, the reproduced signal is obtained in the form of a signal 66' having differentiated positive and negative pulses as shown in FIG. 14b.

Figure 17:
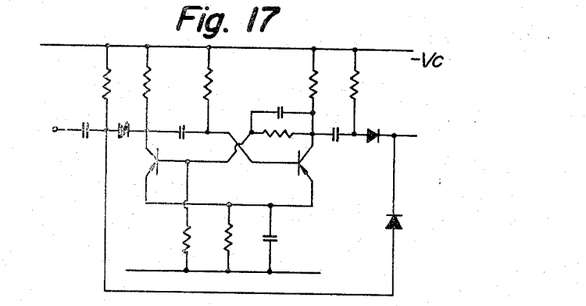
FIG. 17 is an electrical circuit diagram of one form of a doubler shown in the block diagram of FIG. 13.

FIG. 17 shows a circuit arrangement of a doubler 67. The doubler 67 is a frequency multiplier in which positive pulses in the signal of 30 c.p.s. reproduced by the head 66 are added to the positive pulses which are delayed by 180° by the monostable multivibrator.

A synchronizing signal separator 68 is a circuit which acts to take out a vertical synchronzing signal from a video signal impressed on a terminal 69.

Figure 18:
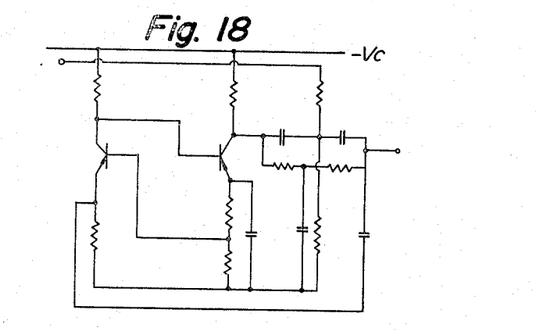
FIG. 18 is an electrical circuit diagram of one form of an oscillator shown in the block diagram of FIG. 13.

A circuit arrangement of a buffer oscillator 70 is shown in FIG. 18. The buffer oscillator 70 is a twin-T type oscillator wherein the separated vertical synchronzing signal or the signal reproduced by the head 66 is oscillated in synchronism with the signal multiplied by the doubler 67. The buffer oscillator 70 makes self-oscillation at a frequency close to 60 c.p.s. when there is no synchronizing signal.

An amplifier 71 acts to amplify the output signal of the oscillator 70 for supplying power to a synchronous motor 72 for driving the rotary disc 58.

A phase shifter 73 is composed of a monostable multivibrator which acts to delay the phase of the output signal of the flip-flop circuit 65 by 90°.

A flip-flop circuit 74 is arranged in a manner that it is triggered by the signal reproduced by the head 66 and the output signal of the phase shifter 73 as shown by a wave form in FIG. 14b, as in the case of the flip-flop circuit 65.

A low pass filter 75 is provided to rectify the output of the flip-flop circuit 73. An amplifier 76 acts to amplify the output of the low pass filter 75 for supplying power to a relay 77. The relay 77 serves to on-off by its contacts 78 the synchronizing signal for driving the oscillator 70 into synchronization and may be formed of a transistor switching circuit.

The magnetic recording and reproducing device illustrated in the block diagram of FIG. 13 operates in the following manner. As shown in FIGS. 14a and 14b, during recording, the vertical synchronizing signal 68' separated from the video signal by the vertical synchronizing signal separator 68 is fed to the oscillator 70 through a switch 79 thrown in the direction of solid line and the secondary circuit contacts 78 of the relay 77, to thereby make the oscillation frequency of the oscillator 70 to synchronize with the vertical synchronizing signal. The secondary circuit contacts 78 are kept closed during recording, as will be described later. The output of the oscillator 70 is amplified by the amplifier 71 and used to rotate the disc driving synchronous motor 72 in synchronism therewith. As described above, the signals 63' and 64' corresponding to the rotation of the rotary magnetic heads 59 and 60 are obtained from the detection heads 63 and 64, respectively. The signals from the respective detection heads are supplied to the flip-flop circuit 65 as described above, and the output 65' of the circuit 65 is delayed by 90° in phase by the phase shifter 73 and supplied to the flip-flop circuit 74. Since, in this case, a switch 80 is at the position of solid line, another input signal to the flip-flop circuit 74 is not supplied thereto. When, therefore, the output is taken out of the collector of the "on" transistor in the flip-flop circuit 74, the output is approximately at the ground potential and there is no output from the filter 75 and the amplifier 76. Therefore, the relay 77 will not work and the secondary circuit contacts 78 are closed.

On the other hand, the output of the flip-flop circuit 65 is impressed on the head 66, as described above, for being recorded on the magnetic tape 56. It will be understood that the signal recorded on the magnetic tape 56 is the one corresponding to the rotary magnetic heads 59 and 60.

Figures 12, 13:
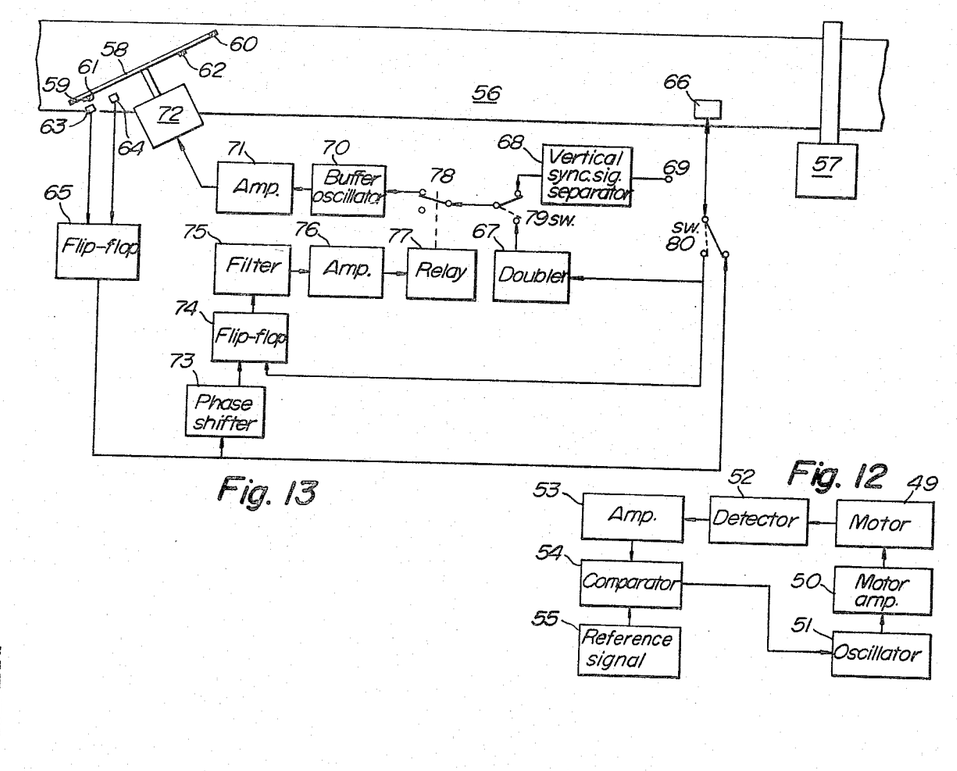
FIG. 12 is a block diagram of an electrical circuit used in a conventional device.
FIG. 13 is a block diagram of an electrical circuit of another embodiment of the magnetic recording and reproducing device of the invention, with driving means forming part of the device also shown.

During reproducing, the switches 79 and 80 are connected in the direction of dotted line in FIG. 13. Therefore, the oscillator 70 and the disc driving synchronous motor 72 are pulled in synchronization by the signal 67' which is obtained by multiplying the reproduced signal by the head 66 in the doubler 67 and supplied thereto through the secondary circuit contacts 78 of the relay 77. The secondary circuit contacts 78 are in the closed state, as will be described later, when the track recorded by the rotary magnetic head 59 during recording is reproduced by the same rotary magnetic head 59 during reproducing. The contacts 78 are in the open state when the rotary magnetic head 60 traces the tracks recorded by other rotary magnetic head 59.

When the track recorded by one of the rotary magnetic heads is reproduced by the same rotary magnetic head during reproducing, the oscillator 70 synchronizes with the signal obtained from the head 66 to thereby rotate the rotary disc 58 in synchronous relation. When, however, the track recorded by one head is reproduced by the other rotary magnetic head, the oscillator 70 does not operate in synchronization, and would act to rotate the rotary disc 58 at the natural oscillation frequency of the oscillator. In this case, there is variation in the phase relation between the outputs 63' and 64' of the respective detection heads 63 and 64 and the output 66' of the head 66. At the phase shifting of about 180°, the flip-flop circuit 74 operates as will be described later, and the output signal of the flip-flop circuit energizes the relay 77 through the filter 75 and the amplifier 76 to thereby urge the secondary circuit contacts 78 to the closed position. The oscillator 70, therefore, operates in synchronism with the signal obtained from the head 66. Therefore, the track recorded by one rotary magnetic head during recording can be reproduced by the same rotary magnetic head.

Or more precisely, the device operates in the following manner. The output signal of the oscillator 70 is supplied through the amplifier 71 to rotate the rotary disc driving synchronous motor 72 in synchronism therewith, and, as described in detail already, with the rotation of the rotary disc 58, the signals 63' and 64' are obtained from the respective detection heads 63 and 64. The signal 63', as shown in FIGS. 14a and 14b, from the detection head 63 is impressed on the flip-flop circuit 65 to trigger a rising portion of the output signal 65' of the flip-flop circuit 65 to make it on, and the output 64' from the detection head 64 is effective to trigger a falling portion of the output signal 65' to make it off, so that the output 65' is shaped as a square wave of 30 c.p.s. The output signal 65' is then delayed by 90° in phase by the phase shifter 73 and supplied to the flip-flop circuit 74.

The pulse signal 66' reproduced by the head 66 is either in the same phase relation with the output 65' of the flip-flop circuit 65 as shown in the state A in FIG. 14a or it has a 180° phase difference from the output 65' as shown in the state B. In the case of the state A, the output 74' of the flip-flop circuit 74 is made "on" by the positive pulse reproduced by the head 66 and then made "off" by the output 73' of the phase shifter 73 in 90° phase delay relation. Therefore, the "on" period is ¼ of one cycle. The output 75' of the filter 75 is positive with respect to a cut-off potential of the amplifier 76 as shown in FIG. 14b, and the amplifier 76 does not conduct. Therefore, the relay 77 does not operate and the secondary circuit contacts 78 are kept in the closed position. In the case of the state B, the output 74' of the flip-flop circuit 74 is made "on" by the positive pulse reproduced by the head 66 and then made "off" by the output 73' of the phase shifter 73 in 270° phase delay relation. Therefore, the "on" period is ¾ of one cycle. The output 75' of the filter 75 is negative with respect to the cut-off potential of the amplifier 76 as shown in FIG. 14b. Therefore, the output of the amplifier 76 energizes the relay 77 and the secondary circuit contacts 78 are urged to the open position. As described previously, the rotary disc 58 does not rotate in synchronism with the signal 66' reproduced by the head 66 until the track is reproduced by the same rotary magnetic head with the one used in the recording, and the rotary disc 58 rotates at the natural oscillation frequency of the oscillator 70. The rotary disc 58 operates in a manner that it is rotated in synchronization when the track is reproduced by the same rotary head with the one used in the recording.

Figure 19:
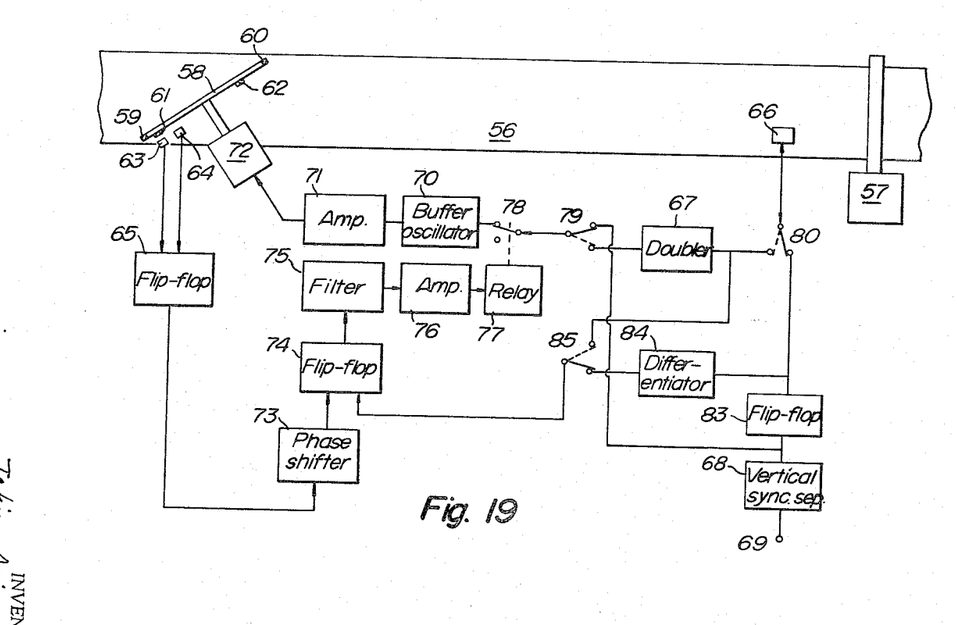
FIG. 19 is a block diagram of still another embodiment of the magnetic recording and reproducing device of the invention.

The invention will now be explained with reference to still another embodiment. This embodiment also relates to a television signal recording and reproducing device of two magnetic head system having a rotary drum similar to the one disclosed in the foregoing embodiments. For detail of its rotary drum driving section, refer to the one explained in the foregoing embodiments. The present magnetic recording and reproducing device is illustrated in FIG. 19. In the present embodiment, its driving section, rotary disc portion and a portion of circuit have functions similar to those of the embodiment shown in FIG. 13. Therefore like numerals are used therein to denote like parts. In the previous embodiment shown in FIG. 13, the square wave signal of 30 c.p.s. obtained from the respective detection heads 63 and 64 through the flip-flop circuit 65 is impressed during recording on the head 66 to record the signal on one edge of the magnetic tape 56 and, during reproducing, the track is reproduced by the same head with the one used in the recording.

According to the embodiment shown in FIG. 19, a vertical synchronizing signal is separated by the synchronizing signal separator 68 from a composite television signal admitted from the terminal 69 and used to actuate a flip-flop circuit 83. A signal of 30 c.p.s. delivered from the flip-flop circuit 83 is supplied to the head 66 for being recorded on the magnetic tape 56, and, during reproducing, the track is reproduced by the same head with the one used in the recording.

Now, the present embodiment will be explained in detail with reference to the block diagram of FIG. 19. The flip-flop circuit 83 is actuated by the vertical synchronizing signal obtained by the vertical synchronizing signal separator 68. A differentiator 84 is provided to differentiate the output of the flip-flop circuit 83.

Figure 20:
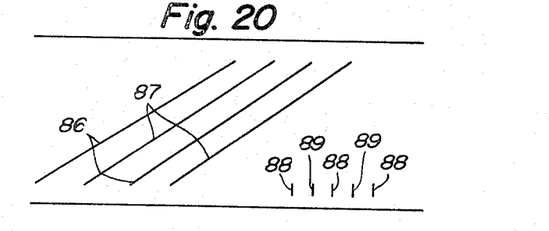
FIG. 20 is a plan view of a portion of a magnetic tape on which tracks are shown as recorded by the device shown in FIG. 19.

The device of this embodiment operates in the following manner. During recording, the vertical synchronizing signal separated from the composite video signal by the vertical synchronizing signal separator 68 is supplied in the direction of solid line through the change-over switch 79 and the secondary circuit contacts 78 in the closed position to energize the oscillator 70 in synchronized relation to thereby drive the rotary disc 58. On the other hand, said vertical synchronizing signal is admitted into the flip-flop circuit 83. The square wave output of 30 c.p.s. from said flip-flop circuit 83 is recorded on the magnetic tape 56 through the head 66. Therefore, tracks 86 and 87 recorded on the magnetic tape 56 by the respective magnetic heads 61 and 62 have a fixed synchronized relation with respect to positive pulses 88 and negative pulses 89 of the signal of 30 c.p.s. recorded on one edge of the magnetic tape 56 by the head 66, as shown in FIG. 20.

Further, the output of the flip-flop circuit 83 is admitted to the differentiator 84 and fed in the form of differentiated positive and negative pulses to the flip-flop circuit 74 through a change-over switch 85 in the direction of solid line. The flip-flop circuit 74 operates in the manner as described in the foregoing embodiment. Therefore, the secondary circuit contacts 78 of the relay 77 are in the closed position, and the signal recorded by the head 66 can be recorded corresponding to the signal recorded by the rotary magnetic heads 59 and 60 and in synchronism with the video signal. During reproducing, the positive and negative pulses of the signal of 30 c.p.s. reproduced by the head 66 are supplied to the doubler 67 through the change-over switch 80 connected in the direction of dotted line and, at the same time, impressed on the flip-flop circuit 74 through the change-over switch 85.

When the recorded track is reproduced by the same rotary magnetic head with the one used in the recording, the output signal of the doubler 67 is impressed on the oscillator 70 through the change-over switch 79 and the secondary circuit contacts 78 of the relay in the closed position, to thereby rotate the rotary disc 58 in synchronous relation. In this case, the flip-flop circuit 74 operates in the manner as described in the previous embodiment, and the relay 77 would not operate.

When the track recorded by one rotary magnetic head is reproduced by the other rotary magnetic head, the flip-flop circuit 74 operates in the manner as described in the previous embodiment to urge the secondary circuit contacts 78 of the relay 77 to the open position. The oscillator 70 oscillates at its natural oscillation frequency, and, when phase variation of about 180° occurs as in the case of the previous embodiment, that is, when the track is reproduced by the same rotary magnetic head with the one used in the recording, the flip-flop circuit 74, filter 75 and amplifier 76 successively operate to urge the secondary circuit contacts 78 of the relay 77 to the closed position. Thereafter, such condition is constantly maintained in which the track on the magnetic tape is traced by the same rotary magnetic head with the one used in the recording.

Although the invention has been explained with reference to the specific embodiments, it will be understood that the invention is in no way limited to such embodiments and various modifications and changes may be made without departing from the spirit of the invention.

What is claimed is:

1. A device for recording and reproducing a television signal comprising a magnetic tape, a rotary head including two magnetic transducers, said magnetic transducers being adapted to successively sweep diagonally across said magnetic tape, an electric motor operative to rotate in synchronism with a vertical synchronizing signal in said television signal, said electric motor being provided with a rotor so featured as to have its magnetic poles disposed at specific angular positions, means for forming tracks of record on said magnetic tape by said rotary head firmly fixed on the shaft of said motor for rotation therewith, means regulated by the predetermined rotation of said magnetic transducers for deriving from the vertical synchronizing signal in said television signal a first control signal having alternate pulses of positive and negative polarities, means for recording said first control signal on one edge of said tape, means for reproducing said recorded first control signal from said magnetic tape for obtaining a second control signal responsive to said first control signal, means for driving by said second control signal said electric motor for rotating said rotary head for reproducing the tracks of record on said magnetic tape, means for deriving an electrical signal dependent upon said predetermined rotation of said magnetic transducers, means for comparing the phase of said second control signal with the phase of said electrical signal for obtaining an error signal, and means for controlling by said error signal said predetermined rotating phase of said magnetic transducers.

2. A device for recording and reproducing a television signal comprising a magnetic tape, a rotary head assembly including therein two magnetic transducers, said magnetic transducers being arranged to successively sweep obliquely across said magnetic tape, said rotary head assembly being driven by an electric motor which has a natural number of revolutions when no synchronizing signal is externally applied thereto and rotates in synchronism with the synchronizing signal when such synchronizing signal is applied thereto, said electric motor being provided with a rotor having its magnetic poles disposed at specific angular positions, means for forming tracks of record on said magnetic tape by said rotary head assembly firmly fixed on the shaft of said motor for rotation therewith, means for deriving a control signal representing a predetermined phase of rotation of said magnetic transducers, means for causing rotation of said electric motor during recording in synchronism with the vertical synchronizing signal in said television signal and for recording said control signal on one edge of said magnetic tape, means for reproducing said recorded control signal from said magnetic tape during reproduction for thereby obtaining a second control signal responsive to said reproduced control signal, means for applying said second control signal as a synchronizing signal to said motor through a gate circuit, means for comparing the phase of said reproduced control signal with the phase of said control signal produced in synchronism with the predetermined phase of rotation of said magnetic transducers during reproduction and for obtaining a third control signal when both these signals have a predetermined fixed phasic relation therebetween, and means for controlling said gate circuit by said third control signal and applying said second control signal according to claim 2, in which said first-mentioned control signal is in synchronous relation with a predetermined phase of rotation of said magnetic transducers.

3. A device for recording and reproducing a television signal according to claim 2, in which said first-mentioned control signal is in synchronous relation with a predetermined phase of rotation of said magnetic transducers.

4. A device for recording and reproducing a television signal comprising a magnetic tape, a rotary head assembly including therein two magnetic transducers, said magnetic transducers being arranged to successively sweep obliquely across said magnetic tape, said rotary head assembly being driven by an electric motor which has a natural number of revolutions when no synchronizing signal is externally applied thereto and rotates in synchronism with the synchronizing signal when such synchronizing signal is applied thereto, said electric motor being provided with a rotor having its magnetic poles disposed at specific angular positions, means for forming tracks of record on said magnetic tape by said rotary head assembly firmly fixed on the shaft of said motor for rotation therewith, means for causing rotation of said motor during recording in synchronism with the vertical synchronizing signal in said television signal, means for recording said vertical synchronizing signal regulated by a predetermined rotation of said magnetic transducers as a control signal on one edge of said magnetic tape, means for reproducing said recorded control signal from said magnetic tape during reproduction for thereby obtaining a second control signal responsive to said reproduced control signal, means for applying said second control signal as a synchronizing signal to said motor through a gate circuit, means for comparing the phase of said reproduced control signal with the phase of said control signal produced in synchronism with the predetermined phase of rotation of said magnetic transducers during reproduction and for obtaining a third control signal when both these signals have a predetermined fixed phasic relation therebetween, and means for controlling said gate circuit by said third control signal and applying said second control signal as a synchronizing signal to said motor for thereby controlling said predetermined phase of rotation of said magnetic transducers.

5. A device for recording and reproducing a television signal comprising a magnetic tape, a rotary head assembly including therein two magnetic transducers, said magnetic transducers being arranged to successively sweep obliquely across said magnetic tape, said rotary head assembly being driven by an electric motor which has a natural number of revolutions when no synchronizing signal is externally applied thereto and rotates in synchronism with the synchronizing signal when such synchronizing signal is applied thereto, said electric motor being provided with a rotor having its magnetic poles disposed at specific angular positions, means for forming tracks of record on said magnetic tape by said rotary head assembly firmly fixed on the shaft of said motor for rotation therewith, means for deriving a first control signal having alternate pulses of positive and negative polarities obtained by a predetermined rotation of said magnetic transducers, means for causing rotation of said electric motor in synchronism with the vertical synchronizing signal in said television signal during recording and for recording said first control signal on one edge of said magnetic tape, means for reproducing said recorded first control signal from said magnetic tape during reproduction for thereby obtaining a second control signal reseponsive to said reproduced first control signal, means for applying said second control signal as a synchronizing signal to said motor through a gate circuit, means for comparing the phase of said reproduced first control signal with the phase of said first control signal having alternate pulses of positive and negative polarities obtatined by the predetermined rotation of said magnetic transducers and for obtaining a third control signal when both these signals have a predetermined fixed phasic relation therebetween, and means for controlling said gate circuit by said third control signal and for applying said second control signal as a synchronizing signal to said motor for thereby controlling said predetermined phase of rotation of said magnetic transducers.

6. A device for recording and reproducing a television signal comprising a magnetic tape, a rotary head assembly including therein two magnetic transducers, said magnetic transducers being arranged to successively sweep obliquely across said magnetic tape, said rotary head assembly being driven by an electric motor which has a natural number of revolutions when no synchronizing signal is externally applied thereto and rotates in synchronism with the synchronizing signal when such synchronizing signal is applied thereto, said electric motor being provided with a rotor having its magnetic poles disposed at specific angular positions, means for forming tracks of record on said magnetic tape by said rotary head assembly firmly fixed on the shaft of said motor for rotation therewith, means for deriving a first control signal responsive to a predetermined rotation of said magnetic transducers, means for causing rotation of said electric motor during recording in synchronism with the vertical sychronizing signal in said television signal and for recording said first control signal on one edge of said magnetic tape, means for reproducing said recorded first control signal from said magnetic tape during reproduction for thereby obtaining a second control signal responsive to said reproduced first control signal, means for applying said second control signal as a synchronizing signal to said motor through a gate circuit, means for deriving a third control signal from said first control signal obtained in response to the predetermined rotation of said magnetic transducers, and means for controlling said gate circuit by said third control signal and applying said second control signal as a synchronizing signal to said motor only when a predetermined fixed phasic relation is established between said second control signal and said third control signal for thereby controlling said predetermined phase of rotation of said magnetic transducers.

7. A device for recording and reproducing a television signal comprising a magnetic tape, a rotary head assembly including therein two magnetic transducers, said magnetic transducers being arranged to successiveyl sweep obliquely across said magnetic tape, said rotary head assembly being driven by an electric motor which has a natural number of revolutions when no synchronizing signal is externally applied thereto and rotates in synchronism with the synchronizing signal when such synchronizing signal is applied thereto, said electric motor being provided with a rotor having its magnetic poles disposed at specific angular positions, means for forming tracks of record on said magnetic tape by said rotary head assembly firmly fixed on the shaft of said motor for rotation therewith, means for deriving a first control signal responsive to a predetermined rotation of said magnetic transducers, means for deriving a second control signal responsive to said first control signal, means for causing rotation of said electric motor during recording in synchronism with the vertical synchronizing signal in said television signal and for applying said vertical synchronizing signal through a gate circuit to a stationary magnetic head disposed adjacent to one edge of said magnetic tape, means for controlling said gate circuit by said second control signal so that that portion of said vertical synchronizing signal which has a predetermined fixed phasic relation with said second control signal can solely be recorded as a third control signal on one edge of said magnetic tape by said stationary magnetic head, means for reproducing said recorded third control signal during reproduction for thereby obtaining a fourth control signal responsive to said reproduced third control signal, means for applying said fourth control signal as a synchronizing signal to said motor through said gate circuit, and means for comparing the phase of said reproduced third control signal with the phase of said first control signal obtained in response to the predetermined rotation of said magnetic transducers so as to control said gate circuit by a signal produced only when both these signals have a predetermined fixed phasic relation therebetween and applying said fourth control signal as a synchronizing signal to said motor for thereby controlling said predetermined phase of rotation of said magnetic transducers.

References Cited

UNITED STATES PATENTS 3,179,870  4/1965  Maxey _____________ 178—6.6

JOHN W. CALDWELL, Acting Primary Examiner.

H. W. BRITTON, Assistant Examiner.